Patented Sept. 18, 1945

2,384,817

UNITED STATES PATENT OFFICE 2,384,817

CATALYTIC ALKALINE OXIDATION OF ALCOHOLS

Henry C. Chitwood, Charleston, W. Va., assignor to Carbide and Carbon Chemicals Corporation, a corporation of New York No Drawing. Application September 5, 1942,
Serial No. 457,515

9 Claims. (Cl. 260—531)

This invention is an improvement in the oxidation of alcohols in an alkaline environment (hereinafter referred to as "alkaline oxidation") to make carboxylic acids and their salts. It comprises the conduct of the oxidation in the presence of cadmium catalyst which includes cadmium metal and compounds thereof. The presence of the catalysts facilitates the reaction and considerably simplifies the process of making carboxylic acids and their salts.

For over a century (Dumas and Stas, Ann., 35, 129-173, 1840) it has been known that alcohols can be converted to alkali metal salts of corresponding carboxylic acids by heating them with alkali metals or alkali metal hydroxides. This reaction proceeds with the evolution of hydrogen, according to the general scheme:

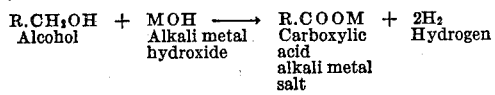

$$R.CH_2OH + MOH \longrightarrow R.COOM + 2H_2$$
Alcohol   Alkali metal   Carboxylic   Hydrogen
          hydroxide      acid
                         alkali metal
                         salt As is indicated, the reaction is applicable only to primary alcohols, and, throughout this description and in the appended claims, all references to alcohols will be understood to designate those alcohols in which at least one characteristic hydroxyl group is attached to a terminal carbon atom.

In accordance with the invention, alcohols are oxidized by heating them in the presence of alkali metal hydroxides and in the presence of a cadmium catalyst to form alkali metal salts of the corresponding carboxylic acids. If desired, the carboxylic acids can then be recovered as such from the salts by conventional methods. The present process is not only advantageous in the previously known oxidations of alcohols in general, but it is particularly valuable in the conduct of the hitherto unknown alkaline oxidation of amino alcohols which is the subject of copending application Serial No. 423,756, filed December 20, 1941. Both of these types of reactions are improved and caused to proceed easily and at lowered temperatures and with higher yields of the desired carboxylic acid salt by the presence of the catalysts herein disclosed. The value and importance of the invention will be apparent.

The invention may be applied to the reaction of alcohols containing one or several hydroxyl groups attached to terminal carbon atoms of saturated or unsaturated straight or branched chain aliphatic radicals or to carbocyclic or heterocyclic radicals. As exemplars of this group of alcohols, there may be named methyl, ethyl, propyl alcohols and all the alkanols of this series up to those of twenty or more carbon atoms, as well as their unsaturated and branched chain analogues and isomers; glycols and polyglycols of the ethylene and propylene glycol series; benzyl, phenyl ethyl and cinnamyl alcohols; and the amino alcohols mentioned in the aforesaid application Serial No. 423,756. In any case, dehydrogenation and replacement of hydrogen by oxygen takes place as indicated by the reaction scheme shown above, but in the catalyzed reaction of this invention the hydrogen is evolved more rapidly and at lower temperatures than in the absence of catalyst, and the reaction proceeds more smoothly and easily with better yields of the carboxylic acid salt.

Of the metals cadmium, copper, nickel, silver, lead and zinc and compounds of these metals, cadmium and its compounds appear to exert the greatest effect and are preferred. Copper compounds exhibit activity only slightly less than cadmium compounds, but the duration of maximum catalytic activity is shorter with copper compounds, due apparently to coagulation following their reduction to copper metal. Nickel, silver, lead and zinc compounds are somewhat less active catalysts than are compounds of cadmium and copper. "Raney" nickel (as described in Patent No. 1,628,190 to Murray Raney) is more effective than nickel compounds, owing probably to its tendency to remain suspended and not to coagulate as does the metallic nickel formed by reduction of nickel compounds in the reaction mixture.

The nature of the action of these catalysts has not been definitely established because of the practical difficulties involved, and, similarly, it is not possible to state whether they function entirely in solution or whether they act at times as heterogeneous catalysts, or, as is probable, in both ways. For example, when cadmium oxide is added to a sufficiently heated mixture of an alcohol and strong alkali it immediately exhibits catalytic activity, but the characteristic brown color of the oxide soon disappears. The cadmium oxide apparently is reduced at least in part to the metal, and in many cases finely divided metallic cadmium can be observed in the reaction mixture. Certain amino alcohols, for instance, tetraethanol ethylene diamine, appear to form complex salts with cadmium which dissolve in the reaction mixture. That cadmium metal is active as a catalyst has been determined experimentally, however, and in reactions of monoethanolamine with potassium hydroxide, the finely divided metal proved to be about as effective catalytically as an equivalent amount of cadmium oxide. Similar considerations apply to the other catalytic materials of this invention.

Either the metals themselves, preferably in finely divided form, or compounds of the metals may be used, and the chemical state attained by the catalyst in the reaction mixture will depend on its individual chemical properties and on the properties of the alcohol and alkali involved. Thus, lead and zinc, even though added as the metals, dissolve in part and catalyze the reaction, while copper, silver and nickel, whether introduced as the metals or their compounds, attain a state of substantially complete reduction to the metals. Cadmium, as pointed out above, appears to be capable of existing in either state, or in both at the same time. In view of these facts, it will be understood that references to cadmium catalyst in this description and in the appended claims are intended to apply to the cadmium in whatever state its catalytic activity may be exerted whether it be the elemental metal or a compound thereof and regardless of the state in which the metal is introduced into the reaction mixture.

The amount of catalyst used may vary widely, and even traces of catalyst exert a discernible effect on the reaction. As larger amounts are used, the rate of reaction becomes more rapid, so that the upper limit on the amount of catalyst is fixed more by economic than by chemical considerations. For most practical purposes, the range of catalyst proportions is one atom of catalyst metal for each 10 to 1000 hydroxyl groups. An optimum range of catalyst proportion (which, in most cases, balances cost of the catalyst and its desirable effect) is one atom of catalyst metal for each 20 to 200 hydroxyl groups.

The temperatures required for the reactions of this invention depend on the nature of the alcohol to be oxidized and on the strength of the alkali used. In general, these temperatures range from about 140° to around 300° C., and they are in every case lower than the temperatures required for the same oxidation in the absence of the catalyst, frequently by as much as 50° to 75° C.

In practice it is desirable to mix the reactants and the catalyst, and to heat the resultant mixture until a substantial evolution of hydrogen occurs, as evidenced either by its escape from the reaction zone or by the rate of increase of pressure if the system is closed. The temperature can be either held at this point or increased somewhat if a more rapid rate of reaction is desired. Completion of the reaction will be apparent from the decrease in the rate of hydrogen evolution, at which time approximately the theoretical quantity of gas will be found to have been given off. In some cases it may be advantageous to add fresh portions of catalyst to the mixture during the course of the reaction to maintain a desired rate of reaction and to insure its completion.

The reaction is apparently independent of pressure, and the operating pressure is of slight importance except to prevent evaporation of the liquids present. If the reaction involves a high boiling alcohol and there is little water present, as in the preparation of glycine from monoethanolamine, the reaction can be conveniently carried out at atmospheric pressure, using a reflux condenser to return volatilized liquid. Reactions involving low boiling alcohols, or those associated with considerable water, should be carried out under sufficient pressure to prevent boiling away of the liquids. In those reactions wherein aqueous alkalies are used, it is preferable to conduct the process in a closed vessel to which a pressure of about 300 pounds per square inch is applied by means of hydrogen or an inert gas. In operation, the pressure can be regulated by adjusting the rate of gas removal from the vessel; or the pressure can be allowed to build up as hydrogen is evolved from the reactants. Tests have shown that increased hydrogen pressure up to as much as 1000 to 1500 pounds per square inch has no apparent effect on the yield of product.

Certain metals, notably carbon steel, have a detrimental effect on the reactions, and appear to affect adversely the yield of desired products. Chromium alloys of iron and the nickel-containing so-called stainless steels are relatively free from this defect. Accordingly, while it is desirable to avoid the contact of unalloyed iron and ordinary steel with the reaction mixtures, stainless steel or the like can be employed for construction of the reaction vessel. Vessels formed of or lined with copper or copper alloys or with cadmium are most advantageous for use in the conduct of the reaction, and are preferred. When a copper or copper-lined vessel is used with cadmium catalysts, its surface soon becomes plated with cadmium.

The invention is illustrated by the following examples:

Example 1.—Glycine

One mol (61 grams) of monoethanolamine, 1.48 mols (91.5 grams) of flaked potassium hydroxide, and 3 grams of cadmium oxide were heated together at atmospheric pressure in a reactor formed of an alloy of copper containing small amounts of silicon and manganese. The reactor and its contents were heated by immersion in an oil bath, and the reactor was vented to the air through a reflux condenser and a gas meter for measuring the hydrogen evolved. When the oil bath temperature reached 160° C., the evolution of hydrogen became rapid. The temperature was gradually increased to 185° C. over a period of 2 hours, and this temperature was maintained for a period of 1 hour 30 minutes. At the end of this time, the evolution of gas had practically ceased. A total of 50 liters of gas was evolved, and this was substantially all hydrogen.

The crude product was removed from the reactor and filtered, using 275 cc. of water for its removal and for washing. The filtrate was evaporated to dryness on a water bath and extracted with successive portions of 95% ethyl alcohol, the total of which was 780 cc. The extract was filtered and acidified with 90 grams of acetic acid. The glycine precipitated by this treatment amounted to 42.4 grams, which on analysis, was found to have a purity of 95.8%. This represents a yield of 54.2% based on the monoethanolamine.

Example 2.—Glycine

One mol (61 grams) of monoethanolamine, 110 grams of flaked potassium hydroxide and 3 grams of cadmium oxide were heated together, using the apparatus and procedure described in Example 1. During a heating period of 4 hours 45 minutes at 160° to 185° C., 49 liters of hydrogen were evolved. At intervals during this heating period, additional small quantities of cadmium oxide were added to the reacting mixture, amounting in all to 3 grams.

The product was worked up and glycine was isolated as in Example 1. In the extraction step, 1400 cc. of 95% ethyl alcohol were employed, and for the final acidification, 106 grams of acetic acid were used. The glycine recovered amounted to 50.6 grams having a purity of 96.3% which corresponds to a yield of 65%.

*Example 3.—Tetracarboxymethyl ethylene diamine*

Tetraethanol ethylene diamine,

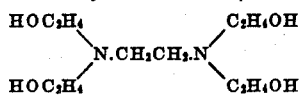

was made by reaction of ethylene diamine and ethylene oxide, and 0.2 mol (47.2 grams) of this substance was heated with 0.84 mol (36.0 grams) of sodium hydroxide, 49.5 grams of water, and 2 grams of cadmium oxide. The reaction vessel, a copper-lined Adkins bomb, was shaken during the reaction. This bomb was connected to a large gas cylinder containing hydrogen at a pressure of 530 pounds per square inch. As hydrogen was evolved during reaction, it passed into this cylinder and the pressure increase was slight. Heating was continued for a period of 3 hours at 220° to 230° C.

After cooling, the reaction product was dissolved in water and the solution was diluted to a volume of one liter. The calcium ion sequestering action of an aliquot portion of this solution was then determined in comparison with that of a sample of the pure sodium salt of tetracarboxymethyl ethylene diamine. The results of this determination showed that the process had yielded sodium tetracarboxymethyl ethylene diamine amounting to 82.5% based on the amino alcohol used. While yields calculated by this method are the total yield of materials having the ability to sequester calcium ions in aqueous solutions, precipitation and recovery of the free tetracarboxylic amino acid from solutions of the sodium salt by means of strong mineral acids, such as sulfuric or hydrochloric acids, can be carried out with almost quantitative results. Determinations by this procedure have given yields sufficiently high to indicate that polycarboxylic amino acids other than that sought were virtually absent.

*Example 4.—Tetracarboxymethyl ethylene diamine*

The potassium salt of this tetracarboxy amino acid was made by heating 0.2 mol (47.2 grams) of tetraethanol ethylene diamine with 106 grams of 85% potassium hydroxide and 0.75 gram of cadmium oxide. The reactor, a round bottomed flask equipped with a motor driven stirrer, was connected through a water-cooled condenser to a wet meter for measuring the hydrogen evolved. The materials were heated by means of an oil bath to 220° C. After 1 hour 50 minutes, 41.8 liters of hydrogen had been evolved and no further gas was given off.

The yield of potassium tetracarboxymethyl ethylene diamine was 84.8% of the theoretical, as determined by the calcium ion sequestering ability of its solution.

*Example 5.—Tetracarboxymethyl propylene diamine*

The sodium salt of this carboxylic amino acid,

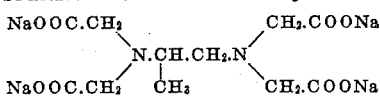

was made by reacting 2 mols (500 grams) of tetraethanol propylene diamine, 8.4 mols (840 grams) of 40% aqueous sodium hydroxide and 20 grams of cadmium oxide at 230° to 240° C. for a period of 3 hours 30 minutes. A reactor as described in Example 3 was used, and the hydrogen evolved was vented at pressures of 500 to 1000 pounds per square inch.

The resulting reaction product was diluted with water, filtered to remove water-insoluble materials, and finally concentrated and dried in vacuo. The dry product was a white, brittle solid which contained 73% of sodium tetracarboxymethyl propylene diamine. The yield of this salt was 80%.

*Example 6.—Pentacarboxymethyl diethylene triamine*

The sodium salt of this polycarboxylic polyamino acid was made by reacting 1.6 mols (517 grams) of pentaethanol diethylene triamine with 840 grams of 40% aqueous sodium hydroxide and 20 grams of cadmium oxide at 230° to 240° C. for 3 hours 20 minutes. The reaction system was similar to that described in Example 3, and the hydrogen was vented at pressures of 500 to 1000 pounds per square inch.

The product was a nearly colorless mass of gel-like consistency. It was dissolved in water, filtered and dried in vacuo at 60° C. The dried material was 788 grams of a white, brittle solid. This product was very effective in sequestering calcium ions, and this and other tests indicated that the product was largely sodium pentacarboxymethyl diethylene triamine,

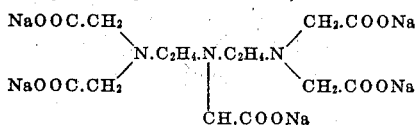

*Example 7.—Hexacarboxymethyl triethylene tetramine*

A mixture of 1.33 mols (545 grams) of hexaethanol triethylene tetramine, 840 grams of 40% aqueous sodium hydroxide and 20 grams of cadmium oxide was heated for 3 hours at 230° to 240° C. in a device as described in Example 3. The hydrogen evolved was vented at pressures of 600 to 1000 pounds per square inch.

The reaction product was a heavy gel-like mass, which was dissolved, filtered and dried in vacuo. The dried product amounted to 677 grams. Tests on this material indicated that it was largely the sodium salt of hexacarboxymethyl triethylene tetramine,

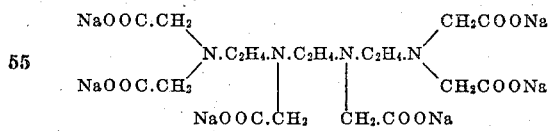

*Example 8.—Caproic acid*

Normal hexanol was oxidized to yield caproic acid by reacting 92 grams of n-hexanol, 108 grams of 38% aqueous sodium hydroxide, 8 grams of cadmium oxide and 3 grams of stearic acid. The stearic acid, with the alkali, served to promote homogeneity of the reaction mixture by partial emulsification. These materials were heated and shaken in a copper-lined Adkins bomb at 255° to 285° C. for a period of 3 hours, during which time the gauge pressure in the bomb increased from 300 to 1650 pounds per square inch.

After cooling, the product was distilled to recover unreacted hexanol, of which 23 grams were obtained. The residue was then acidified with 55 grams of sulfuric acid, whereupon the mixture stratified into two layers. The organic layer was removed and distilled. The main cut of caproic acid boiling at 129° to 130.5° C. at a pressure of 50 mm. of mercury, together with that obtained from the heads cut and residue, amounted to 70 grams. This represents a yield of 67% and a chemical efficiency of 89% of caproic acid from the hexanol.

*Example 9.—Butyric acid*

Following the procedure of Example 8, 185 grams of n-butanol, 300 grams of 38% aqueous sodium hydroxide solution and 9.7 grams of cadmium oxide were reacted for 9 hours at 185° to 285° C.

The product was treated as in the previous example, except that the butyric acid was recovered by extraction of the acidified mixture with ethyl ether. A total of 110 grams of butyric acid was obtained. This represent a yield of 50%. The chemical efficiency of the process was 88%.

*Example 10.—Ethoxyacetic acid*

A mixture of 270 grams of beta-ethoxyethyl alcohol, 157 grams of 95% sodium hydroxide, 342 grams of water and 13.5 grams of cadmium oxide was heated in an Adkins bomb as described in Example 8. Hydrogen pressure of 700 pounds per square inch was initially applied to the contents of the bomb. The reaction began at about 225° C., and, after 9 hours heating at 235° to 250° C., 131 liters of gas had been evolved.

The product was washed from the bomb with 1 liter of water, and this solution was then concentrated by evaporation to about half its volume. Unreacted ethoxyethyl alcohol amounting to 100 grams was recovered from the distillate during this evaporation. The residue was then acidified with 725 grams of 50% sulfuric acid and extracted with ethyl ether. Distillation of the ether extract yielded 104 grams of ethoxyacetic acid having a purity of 99.7% and boiling at 110° to 111° C. at an absolute pressure of 25 mm. of mercury. The total yield of ethoxyacetic acid was 35.6%, and the chemical efficiency of the operation was 56.5%.

The foregoing examples illustrate a few methods for carrying out the invention. In addition to these specific instances, the reaction catalyzed by cadmium compounds has been applied by similar procedures to the production of other alkali salts of carboxylic acids, among which were: glycolic and oxalic acids from ethylene glycol, lactic acid from propylene glycol, dicarboxymethyl amine from diethanolamine, tricarboxymethyl amine from triethanolamine, and isopropyl and butyl dicarboxymethyl amines from the corresponding isopropyl and butyl diethanolamines.

As has been stated, chief among the improvements accomplished by this invention are the shortened reaction times, lowered reaction temperatures and increased yields of products which it makes possible in contrast with uncatalyzed alkaline oxidations. Table I presents a summary of data obtained in typical catalyzed and uncatalyzed reactions for the preparation of glycine and of salts of tetracarboxymethyl ethylene diamine.

*Table I*

| Amino alcohol | Alkali | Catalyst | Time | Reaction temp. | Yield |
|---|---|---|---|---|---|
| | | | Hours | ° C. | Per cent |
| Monoethanolamine—1 mol | 85% KOH; 1.7 mols | None | 32 | 230 | 33 |
| Do | 85% KOH; 1.7 mols | None | 13 | 240 | 32.2 |
| Do | 91% KOH; 1.48 mols | Cadmium oxide, 0.023 mol | 3.5 | 160–185 | 54.2 |
| Do | 91% KOH; 1.78 mols | Cadmium oxide, 0.047 mol | 4.75 | 160–185 | 65 |
| Tetraethanol ethylene diamine—0.5 mol | 85% KOH; 3 mols | None | 17 | 230–260 | 17.5 |
| Do | 95% NaOH; 3 mols | None | 15 | 250–285 | 15 |
| Do | 30% NaOH; 3 mols | None | 15 | 275 | 12 |
| Tetraethanol ethylene diamine—0.2 mol | 85% KOH; 1.6 mols | Cadmium oxide, 0.006 mol | 1.83 | 220 | 84.8 |
| Do | 40% NaOH; 0.84 mol | Cadmium oxide, 0.016 mol | 3 | 220–230 | 82.5 |

While the foregoing has placed particular emphasis on cadmium oxide as the catalyst, other cadmium compounds and cadmium metal may be used with substantially identical results. Comparison of the catalytic activity of various substances has been made by heating monoethanolamine with solid potassium hydroxide in the presence of equivalent atomic proportions of various catalysts. The results of one such comparison are presented in the table below. In each test, the amino alcohol and alkali were heated and stirred until a homogeneous solution was formed. Heating was then continued until a brisk evolution of hydrogen occurred. The reactants were cooled until the gas was given off at a recognizable moderate rate and this temperature taken as the standard of comparison. The material to be tested as a catalyst was then added to the reactants and the mixture was again heated and cooled to a temperature of moderate gas evolution. The cadmium catalyst of this invention causes substantial lowering of the temperature of reaction as will be noted from the table. This test has been proved sufficiently accurate to permit the results to be consistently reproduced within limits of 5° to 10° C.

*Table II*

| Catalyst | Reaction temperature of moderate gas evolution | Remarks |
|---|---|---|
| | ° C. | |
| Blank | 215 | No catalyst present. |
| Cadmium oxide | 150 | Active catalyst. |
| Cadium acetate | 150 | Do. |
| Cadmium metal (mossy) | 170 | Do. |
| Cupric oxide | 150 | Active catalyst. Reduced to metal. |
| Copper metal (powder) | 160 | Active catalyst. |
| Nickelous oxide | 210 | Catalyst. Reduced and coagulated. |
| "Raney" nickel | 180 | Active catalyst. |
| Silver oxide | 185 | Active catalyst. Reduced and coagulated. |
| Silver metal (powder) | 200 | Moderately active catalyst. |
| Basic lead acetate | 195 | Do. |
| Lead dioxide | 200 | Catalyst. Reduced to colorless form. |
| Zinc oxide | 195 | Moderately active catalyst. |

The substances named have similarly been found to catalyze the oxidation of other amino alcohols and of alcohols generally.

Various modifications of the process set forth will be apparent to those conversant with the art, and such modifications are included within the scope of the invention as defined by the appended claims.

I claim:

1. Process of making salts of carboxylic acids which comprises heating an alcohol containing a primary alcohol group wtih a strong alkali at a temperature sufficiently elevated to cause liberation of hydrogen from the reaction mixture and in the presence of cadmium catalyst.

2. Process of making salts of carboxylic amino acids which comprises heating an amino alcohol containing a primary alcohol group and having more than one carbon atom to the molecule with an alkali metal hydroxide at a temperature sufficiently elevated to cause liberation of hydrogen from the reaction mixture and in the presence of cadmium catalyst.

3. Process of making salts of carboxylic acids which comprises heating an alcohol containing a primary alcohol group with a strong alkali at a temperature sufficiently elevated to cause liberation of hydrogen from the reaction mixture and in the presence of cadmium catalyst the amount of said catalyst being about one atomic equivalent of metal for each 10 to 1000 hydroxyl groups of said alcohol.

4. Process of making salts of carboxylic acids which comprises heating an alcohol containing a primary alcohol group with one of the group consisting of sodium and potassium hydroxides in the presence of cadmium catalyst at a temperature sufficiently elevated to cause liberation of hydrogen from the reaction mixture.

5. Process of making salts of carboxylic acids which comprises heating an alcohol containing a primary alcohol group with one of the group consisting of sodium and potassium hydroxides in the presence of cadmium catalyst at a temperature sufficiently elevated to cause liberation of hydrogen from the reaction mixture, the amount of cadmium being about one atom for each 20 to 200 hydroxyl groups of said alcohol.

6. Process of making salts of carboxylic amino acids which comprises heating an amino alcohol containing a primary alcohol group and having more than one carbon atom to the molecule with one of the group consisting of sodium and potassium hydroxides in the presence of cadmium catalyst at a temperature sufficiently elevated to cause liberation of hydrogen from the reaction mixture.

7. In the process of making glycine, the step which comprises heating monoethanolamine with potassium hydroxide in the presence of cadmium catalyst at a temperature sufficiently elevated to cause liberation of hydrogen from the reaction mixture.

8. Process of making salts of polycarboxymethyl ethylene polyamines which comprises heating a polyethanol ethylene polyamine with one of the group consisting of sodium and potassium hydroxides in the presence of cadmium catalyst at a temperature sufficiently elevated to cause liberation of hydrogen from the reaction mixture.

9. A process for making an alkali metal salt of tetracarboxymethyl ethylene diamine which comprises heating tetraethanol ethylene diamine with an alkali metal hydroxide in the presence of cadmium catalyst at a temperature sufficiently elevated to cause liberation of hydrogen from the reaction mixture.

HENRY C. CHITWOOD.